United States Patent [19]
Crotts et al.

[11] Patent Number: 5,148,570
[45] Date of Patent: Sep. 22, 1992

[54] CAR WASH SYSTEM

[75] Inventors: Lonnie M. Crotts, Browns Summit, N.C.; William W. Rambo, Keeling, Va.

[73] Assignee: Bivens Winchester Corporation, Danville, Va.

[21] Appl. No.: 662,269

[22] Filed: Feb. 28, 1991

[51] Int. Cl.⁵ .............................. B60S 3/04
[52] U.S. Cl. ................. 15/97.3; 15/DIG. 2; 134/123
[58] Field of Search .............. 15/97.3, 53.2, 53.3, 15/DIG. 2; 134/123

[56] References Cited

U.S. PATENT DOCUMENTS

| | | |
|---|---|---|
| 1,908,788 | 5/1963 | Pulliam . |
| 3,089,168 | 5/1963 | Blanford . |
| 3,160,903 | 12/1964 | Grass ................. 15/97.3 |
| 3,345,666 | 10/1967 | Hanna et al. . |
| 3,487,490 | 1/1970 | Wuster . |
| 3,499,180 | 3/1970 | Hurwitz . |
| 3,504,394 | 4/1970 | Weigele et al. . |
| 3,510,898 | 5/1970 | Tatora et al. . |
| 3,673,626 | 7/1972 | Mello . |
| 3,683,441 | 8/1972 | Fromme . |
| 3,711,883 | 1/1973 | Ennis . |
| 3,765,043 | 10/1973 | Lesser . |
| 3,825,969 | 7/1974 | Welter . |
| 3,859,686 | 1/1975 | Breish . |
| 3,862,460 | 1/1975 | Rockafellow . |
| 3,914,818 | 10/1975 | Fromme . |
| 3,931,658 | 1/1976 | Evans . |
| 3,940,821 | 3/1976 | Moran . |
| 4,057,866 | 11/1977 | Belanger . |
| 4,087,877 | 5/1978 | Barber . |
| 4,164,053 | 8/1979 | Shelstad . |
| 4,166,302 | 9/1979 | Kim . |
| 4,166,303 | 9/1979 | Fromme . |
| 4,173,805 | 11/1979 | Silcock . |
| 4,207,643 | 6/1980 | Beer et al. . |
| 4,369,541 | 1/1983 | Belanger et al. . |
| 4,439,883 | 4/1984 | Hanna . |
| 4,453,284 | 6/1984 | Schleeter . |
| 4,462,133 | 7/1984 | Hanna . |
| 4,665,378 | 5/1987 | Hackethorn . |
| 4,744,122 | 5/1988 | Beer et al. . |
| 4,852,199 | 8/1989 | Halbus . |
| 4,937,908 | 7/1990 | McCadden . |
| 4,946,513 | 8/1990 | DelPrato et al. ......... 134/123 X |
| 4,998,547 | 3/1991 | Klein ........................ 134/123 X |

Primary Examiner—Edward L. Roberts
Attorney, Agent, or Firm—Krass & Young

[57] ABSTRACT

A car washing system having mitter curtains which are constructed and manipulated in a manner providing effective washing action over the entire vehicle surface during the wash cycle. Additionally, this invention provides a roll-over type wash system which allows the operator to select between a variety of operational modes, including contact and non-contact modes and various wash cycle durations. The invention utilizes a "roll-up" configuration for attaching the mitter curtains to the roll-over washing apparatus. At least one overhead support attaches to a gantry above the path for the vehicle. A number of roller bars attach to the support substantially parallel to one another and extend across the path. Each of the mitter curtains attach to corresponding roller bars, and movement of the support, therefore, produces a scrubbing motion in the mitter curtains. A drive mechanism rotates the roller bars about their lengthwise axes to roll, or unroll, the mitter curtains. In this manner, the drive mechanism for rotation of the roller bars controls the length of the freely hanging portions of the mitter curtains.

72 Claims, 5 Drawing Sheets

CAR WASH SYSTEM

FIELD OF THE INVENTION

The present invention relates to car wash systems and more specifically to car wash systems having mitter curtains adapted to engage a vehicle for cleaning purposes.

BACKGROUND OF THE INVENTION

Many different car wash systems have been designed to eliminate the need to hand wash a vehicle. These systems vary greatly in operation and complexity. Simple systems provide an owner with a convenient, hand-operated system. Typically, these hand-operated systems are located in garage like stalls and adapted to wash stationary vehicles. More complex systems provide for relative motion between the vehicle and the washing apparatus and eliminate owner participation. These complex systems are typically configured as either "roll-over" (i.e. in-bay) or "tunnel" systems. In roll-over systems, the vehicle remains stationary and the wash apparatus moves on a path about the vehicle. In tunnel systems, the apparatus remains stationary and the vehicle moves along a path through the apparatus.

Car wash systems also vary in cleaning methods employed. One type of car wash system uses a scrubbing system in combination with soap and rinse spray devices. Typically, the scrubbing system includes a plurality of mitter curtains adapted to engage the vehicle. The mitter curtains attach to an overhead support and have scrubbing strips which hang freely into the vehicle path. The overhead support generally moves to impart a swinging or flapping motion to the freely hanging scrubbing strips. In this manner, the mitter curtains physically wipe, or scrub, dirt from the vehicle during the wash cycle.

In general, mitter curtain systems provide an effective wash system due to the direct contact of the scrubbing strips with the vehicle surface. However, movement of the overhead structure inherently imparts the most scrubbing motion to the extreme free end of each mitter curtain, so that the vehicle areas contacted by these free ends receive the maximum cleaning action. Since mitter curtains need to be of a sufficient length to contact the lower vehicle surfaces, such as the bumpers and running boards, the free ends of the mitter curtains contacting these lower vehicle surfaces generate the greatest scrubbing motion, whereas the higher portions of the mitter curtains, which contact the higher portions of the vehicle surfaces such as the roof, generate less associated scrubbing motion. These higher vehicle portions, therefore, receive a lower degree of cleaning action resulting in the washing action varying with respect to the different surfaces of the vehicle.

Additionally, contact-type systems have the potential to damage the surface of the vehicle. Abrasive dirt particles can be trapped on the mitter curtains and noticeably scratch the painted surface of the vehicle. This is particularly likely after subjecting a vehicle to repeated washes in the contact-type apparatus.

In order to avoid the potential damage associated with contacting the vehicle surface, another type of wash system utilizes only soap and water spray. In the most basic non-contact system, a hand held wand is physically manipulated by a vehicle owner to direct soap and high pressure spray onto the vehicle surface. In more elaborate systems, nozzles are attached to a framework which moves relative the vehicle, and the spray is directed through the nozzles onto the vehicle surfaces. In either form, the vehicle is cleaned solely by the action of the soap and high pressure water spray directed onto the vehicle surfaces.

Non-contact systems avoid the potential for damage to the vehicle inherent in contact systems, but they typically do not clean a vehicle as effectively as a contact system. Vehicle owners generally have a preference for a particular type of car wash system depending on the result desired. Specifically, vehicle owners desiring the least potential for surface damage typically prefer the non-contact, spray systems, accepting a less effective wash, and vehicle owners desiring the most effective wash, regardless of the potential for surface damage, typically prefer the contact systems.

SUMMARY OF THE INVENTION

The present invention provides a car washing system wherein mitter curtains are constructed and manipulated in a manner providing effective washing action over the entire vehicle surface during the wash cycle. Additionally, the invention provides a roll-over type wash system which allows the operator, either the vehicle owner or the car wash attendant, to select between a variety of operational modes, including contact and non-contact modes and various wash cycle durations.

According to an important feature of the invention, the apparatus includes at least one mitter curtain adapted to engage the vehicle during the wash cycle. A control means operates to adjust the length of the mitter curtain between a plurality of operative lengths during the wash cycle to engage a respective plurality of vehicle portions. A specific mitter curtain length is employed for each portion of the vehicle to maximize the washing effectiveness with respect to all portions of the vehicle.

According to a further feature of the invention, the control system adjusts the length of the mitter curtain as a function of the position of the apparatus relative to the vehicle, so that the operative length of the mitter curtain may at all times be optimized based on the position of the mitter curtain with respect to the vehicle. This adjustment may be controlled in a number of ways. In the most basic form, the length of the mitter curtain adjusts based on the time for the relative movement between the apparatus and the vehicle. In a further embodiment, this adjustment is accomplished in response to operator selection of one of a group of predetermined vehicle profiles so that the operator chooses a profile most closely approximating the profile of the vehicle being washed to maximize the wash system effectiveness. In another embodiment, the apparatus includes a sensing system to detect the instantaneous vehicle height and the mitter curtain is automatically adjusted as a function of this height. In any form, the operative length of the mitter curtain selectively adjusts to maximize the wash system effectiveness.

According to a further feature of the invention, the apparatus provides for further movement of the mitter curtains between a raised storage position and the plurality of operative lengths. Thus, the mitter curtains may be placed in the raised storage position out of the way when not in use during the wash cycle.

According to a further feature of the invention, the apparatus is configured as a roll-over wash system having soap, scrub, and spray systems, and the control means allows the operator to select between a contact mode, in which the spray means, scrubbing means and soaping means are all operative during the wash cycle and a noncontact mode in which only the soaping and spraying means are operative during the wash cycle. This arrangement allows the operator to select between contact and noncontact washing modes depending on vehicle owner preference.

According to a further feature of the invention, the apparatus is adapted to allow an operator to choose between several predetermined wash cycle programs of varying duration. This allows the operator to choose the duration and therefore the completeness of the wash cycle. Several wash cycles are programmed into the control means allowing for different numbers of movements of the apparatus over the vehicle. For example, two, four and six movements of the apparatus may be utilized in alternative wash cycles so as to provide the operator with a variety of wash cycles which vary in duration and corresponding wash effectiveness. These alternative wash cycles may further be provided in both contact and non-contact modes to provide further alternative wash cycles.

To accomplish these features, the preferred embodiment of the present invention utilizes a "roll-up" configuration for attaching the mitter curtains to the roll-over washing apparatus. The apparatus includes a frame, or gantry, positioned over a path for the vehicle, and at least one overhead support attaches to the frame above the path. A number of roller bars attach to the overhead support substantially parallel to one another and extending across the path. Each of the mitter curtains is attached to a corresponding roller bar so that movement of the support produces a scrubbing motion of the mitter curtains. A drive mechanism rotates the roller bars about their lengthwise axes to roll, or unroll, the mitter curtains. In this manner, the drive mechanism for rotation of the roller bars controls the length of the freely hanging portions of the mitter curtains.

The drive mechanism includes an electric motor connected to a series of adjacent wheels. A wheel is secured to each of the roller bars so that the wheels on adjacent roller bars contact one another. With this connection in place, rotation of one of the roller bars, or wheels, causes rotation of all of the roller bars. This provides a simple, efficient drive mechanism.

The apparatus utilizes a plurality of overhead supports to minimize the momentum associated with moving large pieces of apparatus. The overhead supports are disposed in a side-by-side orientation across the path and moved out of phase with one another to impart a scrubbing motion to the hanging mitter curtains and to cancel the inertial effects of the overall movement as it relates to the structure.

BRIEF DESCRIPTION OF THE DRAWINGS

These and other objects and aspects of the invention will become apparent in the detailed description of the invention hereinafter with respect to the drawings in which.

DETAILED DESCRIPTION OF THE PREFERRED EMBODIMENT

The preferred embodiment of the invention car wash system provides for a roll-over apparatus having a plurality of mitter curtains which are manipulated to effectively wash the entire vehicle surface during the wash cycle. Additionally, the car wash system allows the operator to select between various operational modes, including contact and non contact modes, and various wash cycle durations.

Figure 1:
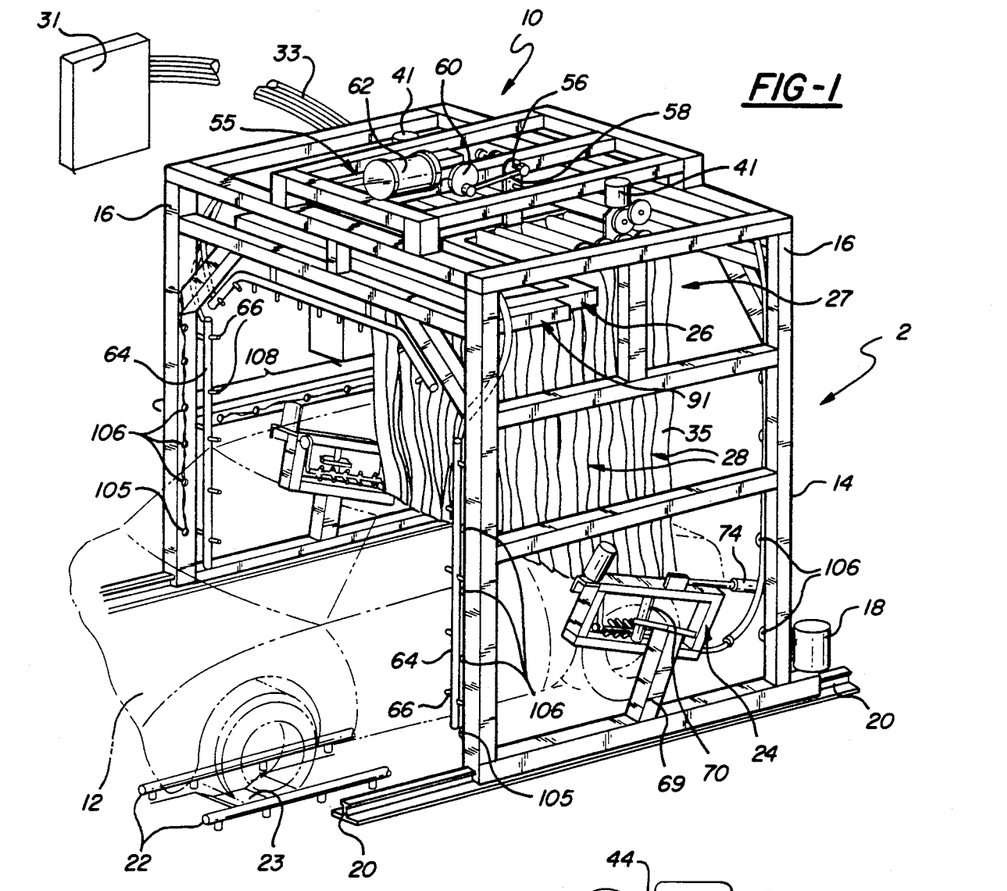
FIG. 1 is a perspective view of a car wash apparatus according to the present invention.
Figure 2:
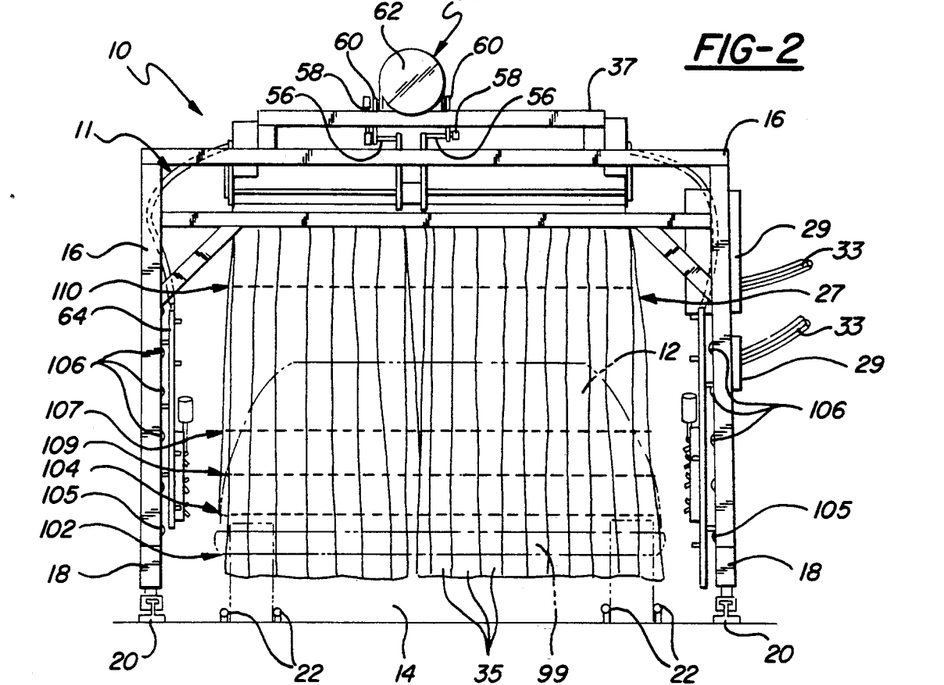
FIG. 2 is an end view of the apparatus looking in the direction of the arrow 2 in FIG. 1.

With reference to FIGS. 1 and 2, the present car wash system is configured as a roll-over wash apparatus 10 adapted to move relative to a vehicle 12 disposed stationarily in the vehicle path 14. A gantry or frame 16 extends above and on both sides of the path 14. The gantry 16 provides the framework for the car wash apparatus 10, and moves relative to the path 14 by operation of drive means 18 which engage a pair of tracks 20 as is known in the industry. Vehicle guide rails 22 position the vehicle 12 width wise in the path 14. A treadle 23, or similar device, determines the lengthwise position of the vehicle 12 along the path 14. In this manner, the vehicle 12 is consistently positioned in the path 14 relative the roll-over wash apparatus 10.

The wash apparatus 10 utilizes various spray systems during the wash cycle. A soap system 11 sprays a low pressure soap solution onto the vehicle 12 during the initial phases of the wash cycle. A further rinse spray system operates during the final phases of the wash cycle to rinse the vehicle 12. This further rinse spray system includes side spray units 24 and an overhead spray unit 26. Each of the spray systems will be disclosed in detail hereinafter.

General control systems for roll-over apparatus 10 are known in the industry. Typically, portions of control systems, such as relays and drive circuitry, may be disposed in enclosed junction boxes 29 located on the gantry 16. Water valves and hoses may also be located on the gantry 16 to control the flow of water for the spray systems. Other portions of control systems, such as computer drives and the like, may be located off of the gantry 16 at an offsite source means 31 and connected thereto by cables in bundle 33. Sources of soap solution and water are likewise located off of the gantry 16 and connected by tubes in bundle 33 to the related structures of the present apparatus. The offsite source means 31 is particularly adapted for placement of bulky or sensitive equipment which would either influence, or be influenced by, the operations of the rollover apparatus 10. A specific control system will be disclosed hereinafter.

The car wash apparatus 10 allows the operator to select between contact and non contact wash modes. A mitter curtain assembly 27 operates during the contact mode to position the plurality of hanging strips 35 of mitter curtains 28 to scrub the surface of the vehicle 12.

The mitter curtain assembly 27 operates to remove the mitter curtains 28 from the path 14 during the non-contact mode.

With reference to FIGS. 3, 4, 5, and 9, the mitter curtain assembly 27 attaches to the gantry 16 above the path 14. The mitter curtain assembly 27 includes a pair of overhead support members 30 mounted on the gantry 16 in a side-by-side manner above the path 14. Each support member 30 includes a rectangular frame 32 and two upwardly extending attachment arms 34 attached to opposite sides of the frame 32. Bearing units 36 disposed on each of the upwardly extending attachment arms 34 journal on a rod 38 which is secured to the overhead gantry frame members 37 and extends transverse to the path 14. The support members 30 thereby pivotably attach to the gantry 16. The mitter curtain assembly 27 further includes a low pressure spray unit 39 to direct water onto the mitter curtains 28 from above to rinse soap and dirt from the mitter curtains 28. The spray unit 39 thereby cleans the mitter curtains 28 to minimize damage to the vehicle 12.

The present invention utilizes a "roll up" configuration to attach the mitter curtains 28 to the overhead support members 30. A plurality of substantially cylindrical roller bars 40 attach to each of the overhead support members 30 and extend substantially parallel to one another so that the lengthwise axes of the roller bars 40 are transverse to the path 14. The ends of the roller bars 40 engage opposed sides of the rectangular frame 32 in a manner allowing the roller bars 40 to rotate about the lengthwise axes thereof. A mitter curtain 28 attaches to each roller bar 40. One end of each mitter curtain 28 typically attaches along the entire length of a respective roller bar 40. In this manner, rotation of a roller bar 40 in one direction winds the respective mitter curtain 28 about the roller bar 40, and rotation of the roller bar 40 in the opposite direction unwinds the mitter curtain 28 from the roller bar 40. This provides the means to adjust the length of the mitter curtains 28.

Figure 9:
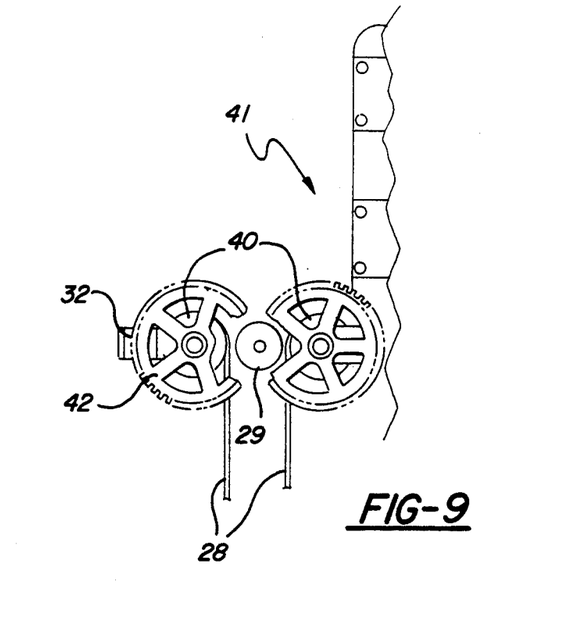
FIG. 9 is a cutaway end view of the mitter curtain assembly of FIG. 5 showing the squeezing roller in relation to the mitter curtains.

A squeezing bar 29, either fixed or rotatable, is disposed between pairs of roller bars 40, as is shown in the cutaway view of FIG. 9 to remove water and soap from the mitter curtains 28 during operation of the apparatus. Specifically, as the mitter curtains are rolled up on the roller bars 40 the effective diameter of the roller bars 40 increases. Thus, at a given point the rolled mitter curtains 28 of respective pair of roller bars 40 will begin to bear on the squeezing bar 29 as the bar rotates so that water and soap are removed (or squeezed) from the mitter curtains 28. This prevents unwanted soap and water from dripping on the vehicle surfaces during latter stages of wash cycles, such as those disclosed hereinafter.

Figure 4:
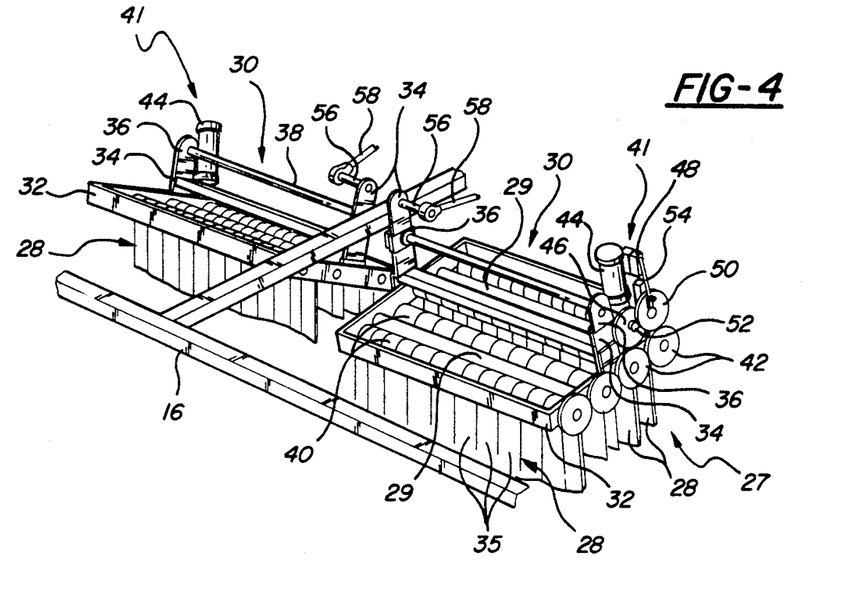
FIG. 4 is a fragmentary perspective view of a mitter curtain assembly utilized in the apparatus of FIG. 1.
Figure 5:
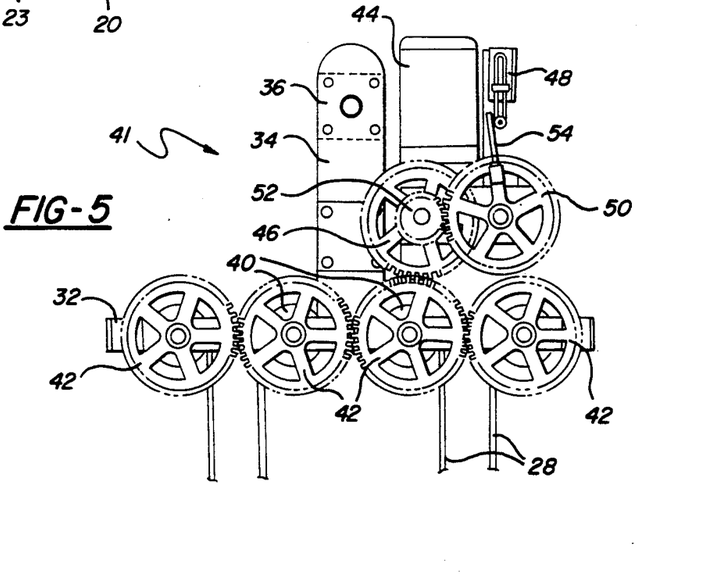
FIG. 5 is an end view of the mitter curtain assembly of FIG. 4 showing an alternate drive configuration.

A separate drive mechanism 41 is associated wit the roller bars 40 of each of the support members 30. Each drive mechanism 41 includes a plurality of wheels 42 respectively secured coaxially to the plurality of roller bars 40. The wheels 42 are secured to the roller bars 40 outside of the rectangular frame 32 and are arranged in a manner such that the wheels 42 associated with adjacent roller bars 40 contact one another. An electric motor 44 attaches to a drive wheel 46, which contacts one of the wheels 42 associated with a roller bar 40. The electric motor 44 rotates the drive wheel 46 causing rotation of the contacted wheel 42 and associated roller bar 40. Since all of the wheels 42 associated with adjacent roller bars 40 contact one another, rotation of the drive wheel 46 causes rotation of all of the roller bars 40 of the related support member 30. Since adjacent roller bars 40 rotate in opposite directions due to the drive mechanism 41, the mitter curtains 28 on adjacent roller bars 40 must wind and unwind from alternate sides of the roller bars 40 to accomplish the same movement of the mitter curtains 28 for all the roller bars 40.

Wheels 42 are formed of rubber or other elastomeric material (as is shown in FIG. 4) so that rust, caused by the humid car wash environment, does not adversely affect the drive mechanism 41. Adjacent wheels 42 engage one another solely by friction. Alternatively, wheels 42 can be formed as rigid gears (as is shown in FIG. 5) to provide meshing teeth which more positively engage adjacent wheels in the drive system 41.

Each drive mechanism 41 positively drives the associated roller bars 40 in one direction to wrap the mitter curtains 28 on the respective roller bars 40, and in the opposite direction to unwrap the mitter curtains 28 from the respective roller bars 40. To prevent the mitter curtains 28 from being overwound onto or off of the roller bars 40, a limit switch 48 is disposed relative each drive mechanism 41. A monitoring wheel 50 contacts the hub wheel 52 attached coaxially to the drive wheel 46. The monitoring wheel 50 rotates upon activation of the drive mechanism 41. A plastic coated pin 54 extends off of the monitoring wheel 50 and contacts an arm on the limit switch 48 to disengage the drive mechanism 41 upon sufficient rotation of the monitoring wheel 50 in either direction. The number of rotations of the roller bars 40 which are allowed before the limit switch 48 de-activates the drive system 41 is determined by the ratio of the monitoring wheel 50 diameter to the hub wheel 52 diameter. The height of the gantry 16, and the diameter of the roller bars 40, also affect the required number of revolutions for a given movement. Using these factors, the amount to which the roller bars are allowed to rotate to roll and unroll the mitter curtains 28 is correspondingly determined.

Figure 3:
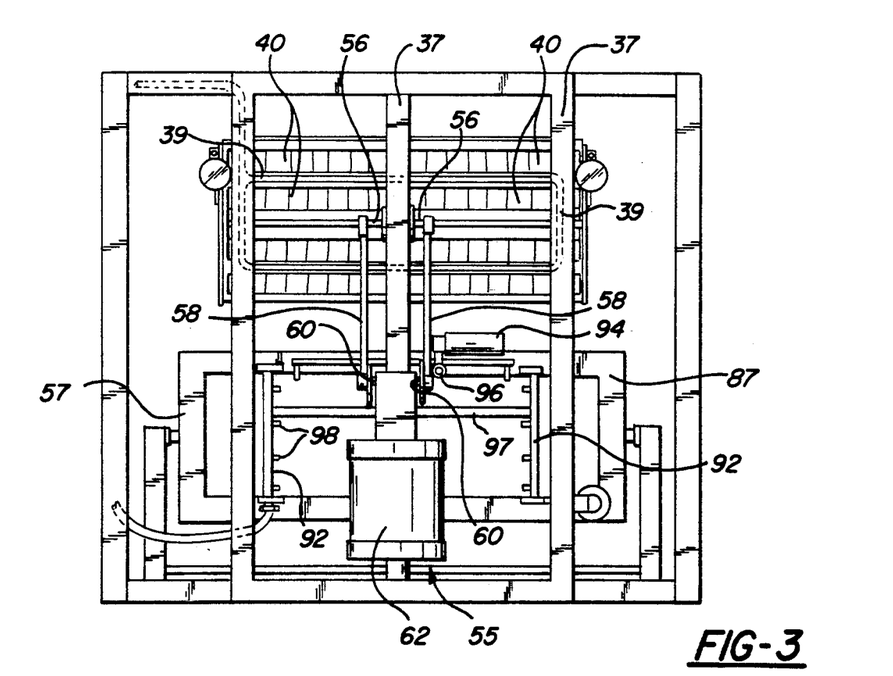
FIG. 3 is a top view of the apparatus of FIG. 1.

A second drive mechanism 55 further engages the support members 30 to move the support members 30 relative the path 14 and provide a scrubbing motion to the hanging mitter curtains 28. Pins 56 project from the inboard upwardly extending attachment arm 34 of each overhead support member 30 and engage a respective linkage arm 58 above the gantry 16. The linkage arms 58 connect to respective output crank arms 60 associated with a further electric motor 62 secured to one of the overhead gantry frame members 37. Rotation of the output crank arms 60 by operation of the further electric motor 62 causes the overhead support members 30 to pivot about the axis formed by the rod 38. The output crank arms 60 are preferably configured 180° out of phase with one another causing out of phase pivotable movement as between the overhead support members 30 to cancel the substantial inertial forces associated with movement of a large object.

Figure 7:
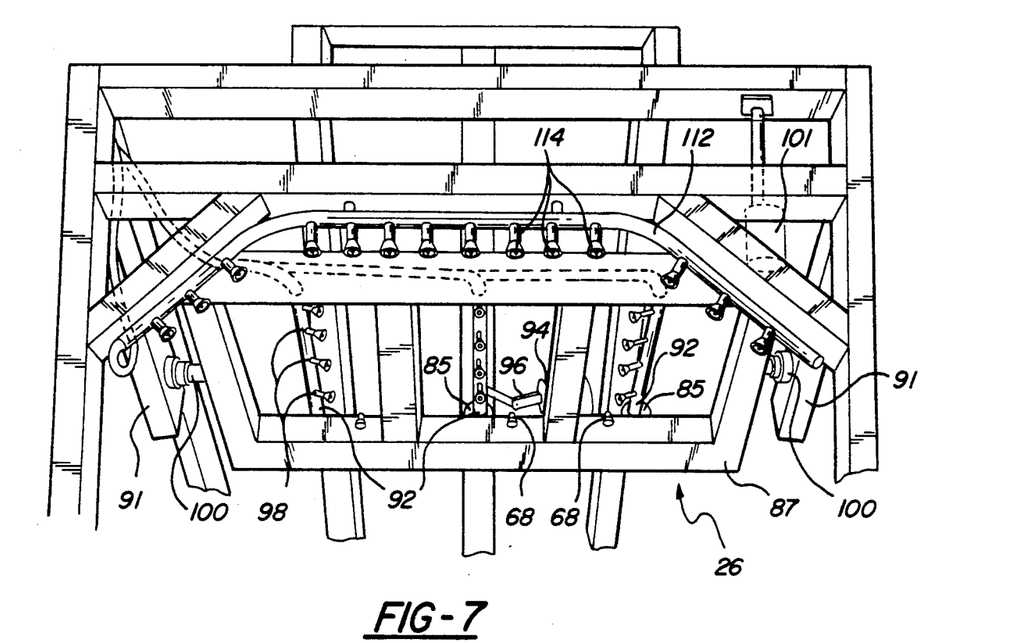
FIG. 7 is a perspective view of the underside of an overhead spray system of the apparatus of FIG. 1.

As previously disclosed, and with reference to FIGS. 1, 2 and 7, the apparatus includes a plurality of spray systems. The soap spray system 11 is disposed to direct soap solution onto the vehicle 12 from all sides, and includes vertically disposed side spray bars 64 mounted on the gantry 16 on each side of the path 14. Individual nozzles 66 disposed along the side spray bars 64 extend toward the path 14 and direct a low pressure wide angle spray onto the vehicle. Soap spray system 11 further includes soap spray nozzles 68 fixedly attached to the overhead rinse spray unit 26 direct a wide angle spray of soap solution onto the top surfaces of the vehicle in like fashion.

Figure 6:
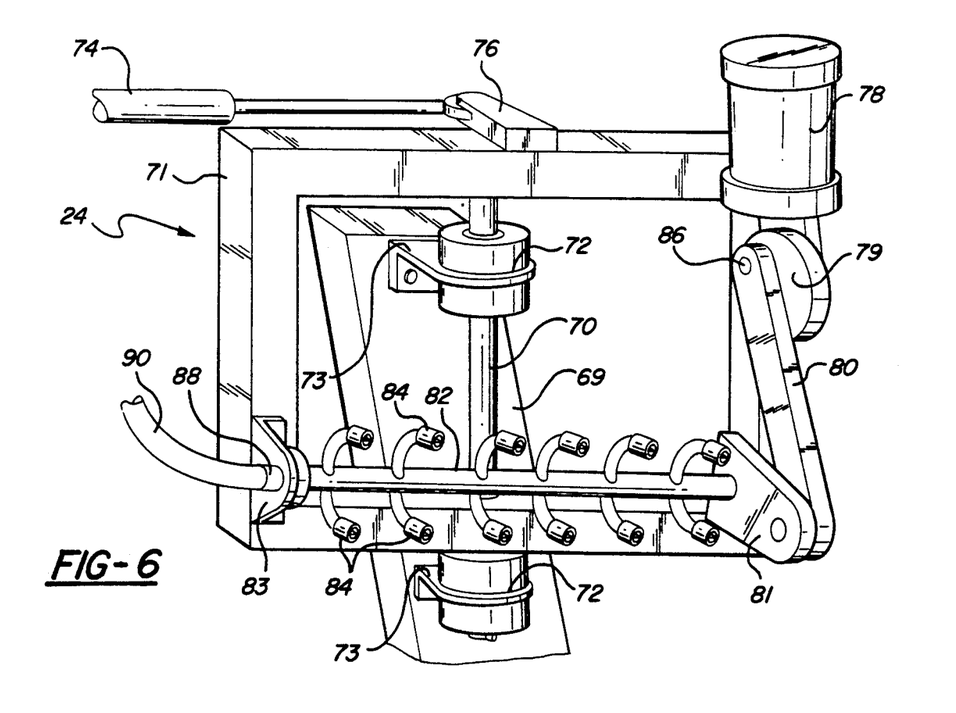
FIG. 6 is a perspective view of a side spray system utilized in the apparatus of FIG. 1.

With reference also to FIG. 6, the side spray units 24 point toward the path 14 and operate virtually identically to and relatively synchronized with one another. Each side spray unit 24 includes a rectangular frame 71, mounted on post 69 extending upwardly from the gantry 16 at a slight angle with respect to the vertical; a spray bar 82 journaled in brackets 83 attached to frame 25; and a plurality of low-angle nozzles 84 mounted on and spaced horizontally along spray bar 82. The units 24 are adapted to pivot about attachment points 72 on pivot rod 70 which engages brackets 73 secured to post 69. A power cylinder 74 engages a linkage arm 76 extending rearwardly off of the frame 71 to pivot the side spray unit 24. The cylinder 74 attaches to gantry 16, as shown in FIG. 1. The pivoting of the side spray units 24 serves a dual purpose. First, the side units 24 pivot to direct high pressure rinse spray from nozzles 84 forward relative the movement of the gantry 16 over the vehicle 12. This produces angled sprays tending to shear the dirt from the vehicle 12. Secondly, the side units 24 pivot so that, at the forwardmost and rearwardmost point of the gantry movement, the side units 24 pivot backward relative to the motion of the gantry 16 to spray the vehicle 12 end surfaces. Thus, the side units 24 pivot to provide complete spray coverage for the sides and ends of the vehicle 12.

Additionally, each spray unit 24, has an electric motor 78 having rotary output means 79 adapted to engage the linkage assembly 80 at attachment point 86 of each spray bar 82. The low angle nozzles 84 point toward the path 14 and produce concentrated spray streams associated with each of the side spray units 24. Operation of the motor 78 rotates rotary output 79 to move the linkage assembly 80 which engages arm 81 to oscillate the spray bar 82 about the end pivot points established by brackets 83 to produce a sweeping effect of the spray streams on the side of the vehicles. The rotary output means 79 is of sufficiently small diameter as compared to arm 81 so that the spray bar 82 oscillates in a substantially up and down motion. Rotary coupling 88 on hose 90 allows oscillatory movement of the spray bar 82.

With reference to FIGS. 3 and 7, the overhead spray unit 26 provides a high pressure rinse spray system. The overhead unit 26 includes a rack 87 mounted on overhead gantry frame members 91 so that the rack 87 extends across the path 14. The overhead spray unit 26 further includes three spray bars 92 attached at intervals on the overhead rack 87. The spray bars 92 extend along the path 14 and are journaled at their ends in brackets 85 attached to the rack 87 for rotational movement. Low angle nozzles 98 on each of the spray bars 92 are directed toward the center of the path 14. Specifically, the center spray bar 92 has nozzles 98 directed downwardly, while the outer two spray bars 92 have nozzles 98 which cant inwardly toward the center of the path 14.

Electric motor 94 and linkage system 96 attaches to the center spray bar of the three spray bars 92. The linkage system 96 is adapted to produce oscillatory movement in center spray bar 92 in a manner similar to the oscillation of the side spray bar 82 units. Gang bar 97 interconnects the three spray bars 92 with rotatable couplings so that all three spray bars 92 may be oscillated about the end pivot points to produce a sweeping motion in the spray across the top of the vehicle.

The entire rack 87 further pivots about the end connections 100 by operation of a power cylinder 101 pivotably attached to the gantry 16 and the rack 87 respectively. This pivoting serves a dual purpose similar to the pivoting of the side spray units 24. First, the rack 87 pivots to direct high pressure rinse spray forward relative to the movement of the gantry 16 over the vehicle 12. This produces an angled spray tending to shear the dirt from the vehicle 12. Secondly, the rack 87 pivots so that, at the forwardmost and rearwardmost point of the gantry movement, the rack 87 pivots backward relative the motion of the gantry 16 to spray the vehicle end surfaces. Thus, the rack 87 also pivots to provide coverage for the top and ends of the vehicle 12.

A low pressure, or "tag along", rinse spray bar 112 is also employed in the present invention. Spray bar 112, includes a plurality of wide angle nozzles 114, and is attached to the gantry 16 proximate one end of the gantry 16 for directing a low-pressure, wide-angle rinse spray onto the vehicle. Spray bar 112 is positioned on the rearwardmost portion of the gantry 16 relative to the final movement of the gantry 16 so that the spray therefrom is the last spray applied to the vehicle 12. This spray prevents streaking, or striping, associated with high pressure rinse spray systems and washes away any remaining soap solution which may inadvertently drip from the gantry 16 or other overhead structures.

MITTER CURTAIN OPERATION

In use, the previously described mitter curtain assembly 27 is designed to vary the length of the mitter curtains 28 in relation to the vehicle to be cleaned. This length variation is preferably accomplished in one of several ways. In the present invention's most basic form, and with reference to FIG. 2, the mitter curtains 28 have a raised storage position 110, a maximum length position 102 for use proximate the front and rear end surfaces of the vehicle, and a single intermediate position 104 for use in washing the entire middle section of the vehicle. The movement of the mitter curtain 28 between maximum length position 102 and intermediate position 104 is accomplished by a time value system based on the known duration of a single movement of the apparatus 10 over a standard 16 foot vehicle. Thus, the mitter curtains 28 are disposed in their maximum length position 102 to engage the lower vehicle surfaces such as the bumper 99 and the surfaces thereunder only at the very beginning and the very end of a given apparatus movement, and the mitter curtains are disposed in the intermediate position 104 during the intermediate portion of the apparatus movement.

A modification on this basic form utilizes a single sensor 105 mounted on the gantry 16 to detect the vehicle in the path 14. Typically, the treadle 23 and rail 22 positioning devices place a vehicle in a known position in the path 14. The majority of vehicles are effectively washed with the previously described time value operation system. However, relatively short vehicles do not extend as far into the path 14. To vary the wash cycle to accommodate short vehicles effectively, a sensor 105 operates to detect the vehicle. The sensor 105 is positioned to direct a light beam across the path 14 at bumper 99 level to detect the vehicle ends. The system is then programmed to begin the standard time value wash cycle at such time as the vehicle is detected. Thus, the wash cycle is shortened for short vehicles which are not immediately detected. This conserves water and maintains the mitter curtains 28 at the maximum length position 102 to engage the lower end surfaces of short vehicles.

Alternatively, it is envisioned that the mitter curtain assembly 27 can be further programmed according to an average vehicle profile, such as the profile of a typical sedan, van, pickup truck, sports car, or station wagon. Using a van as an example, the vehicle profile could include an additional mitter curtain intermediate length position 107 to further vary the operative lengths of mitter curtains 28 to correspond with vehicle surfaces of varying height. The mitter curtains 28 would also raise quickly from maximum length position 102 to intermediate position 107 as the apparatus moves from the rear of the van forward due to the rapid rise in height of the vehicle at the back of the van. The mitter curtain 28 would then lower to another intermediate position 104 as the hood is encountered; whereafter, the mitter curtains 28 would lower to maximum length position 102 to engage the front end surfaces of the vehicle. The van profile for the forward movement of the apparatus is thus 102, 107, 104, 102, and the reverse order for the rearward movement of the apparatus. A sports car profile, by contrast, would not raise the mitter curtain 28 as high or as quickly in a given movement over the vehicle due to the overall low profile of a sports car. A sports car profile might use a separate intermediate mitter curtain position 109 to wash the top surfaces of the vehicle, such that the profile for the sports car in the forward movement of the apparatus is 102, 104, 109, 104, 102.

Further, it may be determined that some areas of a vehicle should not be contacted by the mitter curtains 28. For example, the beds of pickup trucks typically contain various materials which may damage or soil the mitter curtains 28. It may be determined that the mitter curtains 28 should be elevated so as to not contact the bed of the pickup truck. The forward movement profile of a pickup truck may include 102, 109, 107, 104, 102. This vehicle profile alternative thus provides an operator with selection as between one of a set of preprogrammed profiles corresponding respectively to various known vehicle profiles.

A further alternative includes an array of vehicle sensors 106 which are positioned on the gantry 16 and which operate to detect the instantaneous vehicle height so that the mitter curtains 28 may be adjusted continuously during the wash cycle to optimize the scrubbing effect on the vehicle. The sensors 106 are preferably infrared light beam emitters and receivers which are paired and disposed to project a vertically spaced array of light beams across the vehicle path 14. Using sensors 106, multiple intermediate positions of the mitter curtain 28 are utilized to effectively clean the vehicle.

The vehicle sensors 106 cannot be positioned directly beneath the mitter curtains 28 because the mitter curtain would interfere with the light beams. The distance 108 between the light beams of the sensors 106 and the mitter curtains 28 is used to correlate the instantaneous vehicle height with the position of the mitter curtains 28. The instantaneous vehicle height below the mitter curtains 28 is, therefore, determined based on the distance between the mitter curtain 28 and the sensors 106. Preferably, the sensors 106 would be positioned on the gantry 16 ahead of, or leading, the mitter curtains 28 relative a given movement of the apparatus 10 so as to sense the vehicle prior to the mitter curtain engaging the vehicle. Thus, two series of sensors 106 would be used; one operative during the forward movements of the apparatus 10, and the other operative during the rearward movements of the apparatus 10. Alternatively, the sensors 106 may be forward of the mitter curtains 28 during the first movement of the apparatus 10 over the vehicle and the vehicle height information may be stored for use in subsequent movements.

OPERATION OF THE WASH CYCLE

The present roll-over car wash system operates to wash the vehicle by making several movements over the vehicle. Initially, the soap spray system operates to wet the vehicle. In a contact-type wash cycle, the mitter curtains operate to scrub the vehicle. Thereafter (or alternatively in a noncontact type system), a high pressure spray rinses the vehicle. Finally, a low pressure rinse is utilized. Each of these steps may occur alone in a given movement of the apparatus or in combination, as will be disclosed hereinafter.

The present invention is adapted to provide a number of different wash cycles. Specific wash cycles may be tailored to the specific requirements of a user; however, the following wash cycles have been found to be especially effective.

In each of the contact wash cycles using the mitter curtains 28, the length of mitter curtains 28 is varied during use between the maximum fully extended position 102 and at least one intermediate, or shortened, position, such as 104, 107, or 109. As previously indicated, the manner of varying mitter curtain length may include sensors to detect the surface of the vehicle, or alternatively, the length could vary as a function of the position of the vehicle relative to the apparatus, or as a pre-selected profile. When the apparatus rinses the vehicle the mitter curtains 28 are rolled on the roller bars 40 to place the hanging positions of the mitter curtains 28 in the raised storage position 110.

For a relatively quick contact wash utilizing both the mitter curtains 28 and the spray systems, the following progression, starting from the rear of an average 16 foot vehicle, is utilized:

| MOVEMENT | APPARATUS | DIRECTION |
| --- | --- | --- |
| 1 | Soap/Mitter Raise Mitter | forward |
| 2 | Rinse | rearward |

This quick wash utilizes several of the features previously described. The first movement includes two pauses, or dwells, (for example, five-second each) for longer contact of the mitter curtain 28 with the windshield and grill of the vehicle. It should be noted that the direction of the equipment is designated as forward; however, this is arbitrary terminology and has no relation to the orientation of the vehicle in the equipment. The second movement includes a high pressure rinse directed onto the vehicle from the pivoting and oscillating spray systems described previously. Again, the designation of movement rearward only means opposite the direction of the first movement. Fourteen gallons of water are typically used by the high pressure rinse, while seven gallons of water for the second movement are typically used by the low pressure, "tag along" rinse. The "tag along" rinse blankets the vehicle after the high pressure rinse to prevent striping as previously disclosed.

For a relatively complete contact wash utilizing both the mitter curtains 28 and the spray systems the following progression, again starting from the rear of the vehicle, is utilized:

| MOVEMENT | APPARATUS | DIRECTION |
| --- | --- | --- |
| 1 | Soap/Mitter Mitter dwell | forward |
| 2 | Mitter Mitter dwell Raise Mitter | rearward |
| 3 | Rinse reverse drive | forward |
| 4 | Rinse | rearward |

This wash cycle allows the mitter curtains 28 to dwell to contact the grill of the vehicle between the first and second movements, and on the rear of the vehicle between the second and third movements. The fourth movement would include the high and low pressure spray systems for the final rinse.

For the most complete contact wash utilizing both the mitter curtains 28 and the spray systems the following progression, starting from the rear of the vehicle, is utilized:

| MOVEMENT | APPARATUS | DIRECTION |
| --- | --- | --- |
| 1 | Soap lower mitter | forward |
| 2 | mitter mitter dwell | rearward |
| 3 | mitter mitter dwell | forward |
| 4 | mitter mitter dwell raise mitter | rearward |
| 5 | rinse reverse drive | forward |
| 6 | rinse | rearward |

The first movement of the apparatus 10 utilizes the soap system alone, allowing the soap solution to soak into the dirt on the vehicle. The mitter curtains 28 thereafter engage the vehicle for complete cleaning. The low pressure and high pressure spray systems are utilized for the final rinse. Alternatively, the fourth movement may be a rinse cycle if less mitter curtain 28 contact is desired, and the low pressure rinse not used in the final movement.

Similar progressions are utilized when the apparatus is performing non-contact, spray only wash cycles. For a relatively quick noncontact wash utilizing the spray system alone the following progression, starting from the rear of an average 16 foot vehicle, is utilized:

| MOVEMENT | APPARATUS | DIRECTION |
| --- | --- | --- |
| 1 | Soap reverse drive | forward |
| 2 | Rinse | rearward |

This two movement quick wash allows the soap solution to soak into the dirt, and utilizes both high and low pressure rinses in the final movement. The "tag along" rinse blankets the vehicle after the high pressure rinse to prevent striping.

For a relatively complete noncontact wash utilizing only the spray system the following progression, starting from the rear of the vehicle, is utilized:

| MOVEMENT | APPARATUS | DIRECTION |
| --- | --- | --- |
| 1 | Soap reverse drive | forward |
| 2 | none reverse drive | rearward |
| 3 | Rinse reverse drive | forward |
| 4 | Rinse | rearward |

This wash cycle allows the soap to dwell on the dirt during the second movement. This increased dwell time, associated with the second movement, allows the soap to penetrate the dirt to effectively clean the vehicle under the high pressure rinse. The fourth movement also preferably includes the high and low pressure systems for the final rinse.

Finally, the most complete noncontact wash utilizing only the spray system, the following progression, starting from the rear of the vehicle, is utilized:

| MOVEMENT | APPARATUS | DIRECTION |
| --- | --- | --- |
| 1 | Soap reverse drive | forward |
| 2 | none reverse drive | rearward |
| 3 | rinse reverse drive | forward |
| 4 | rinse reverse drive | rearward |
| 5 | rinse reverse drive | forward |
| 6 | rinse | rearward |

This wash cycle again allows the soap solution to soak into the dirt on the vehicle. The low pressure system is utilized alone during the last movement for the final rinse.

It should be recognized that endless variations on these disclosed cycles are possible. Variations in water amounts, cycle times, and timing of units operated can be used to produce various washing patterns in this apparatus. For instance, it may be advantageous on a given movement to utilize the overhead spray unit 26 and one side spray unit 24. On the reverse movement thereafter, the overhead spray unit 26 and the opposite side spray unit 24 may be operated. This technique may be utilized to direct higher pressure, and larger water volume sprays onto the vehicle from the water source than otherwise possible if all units were operated simultaneous. This technique may require the use of larger nozzles to accommodate the enhanced spray depending upon the equipment utilized. Other variations are readily apparent, such as variations in speeds of specific movements in a cycle to allow increased (or decreased) washing actions on the vehicle.

Figure 8:
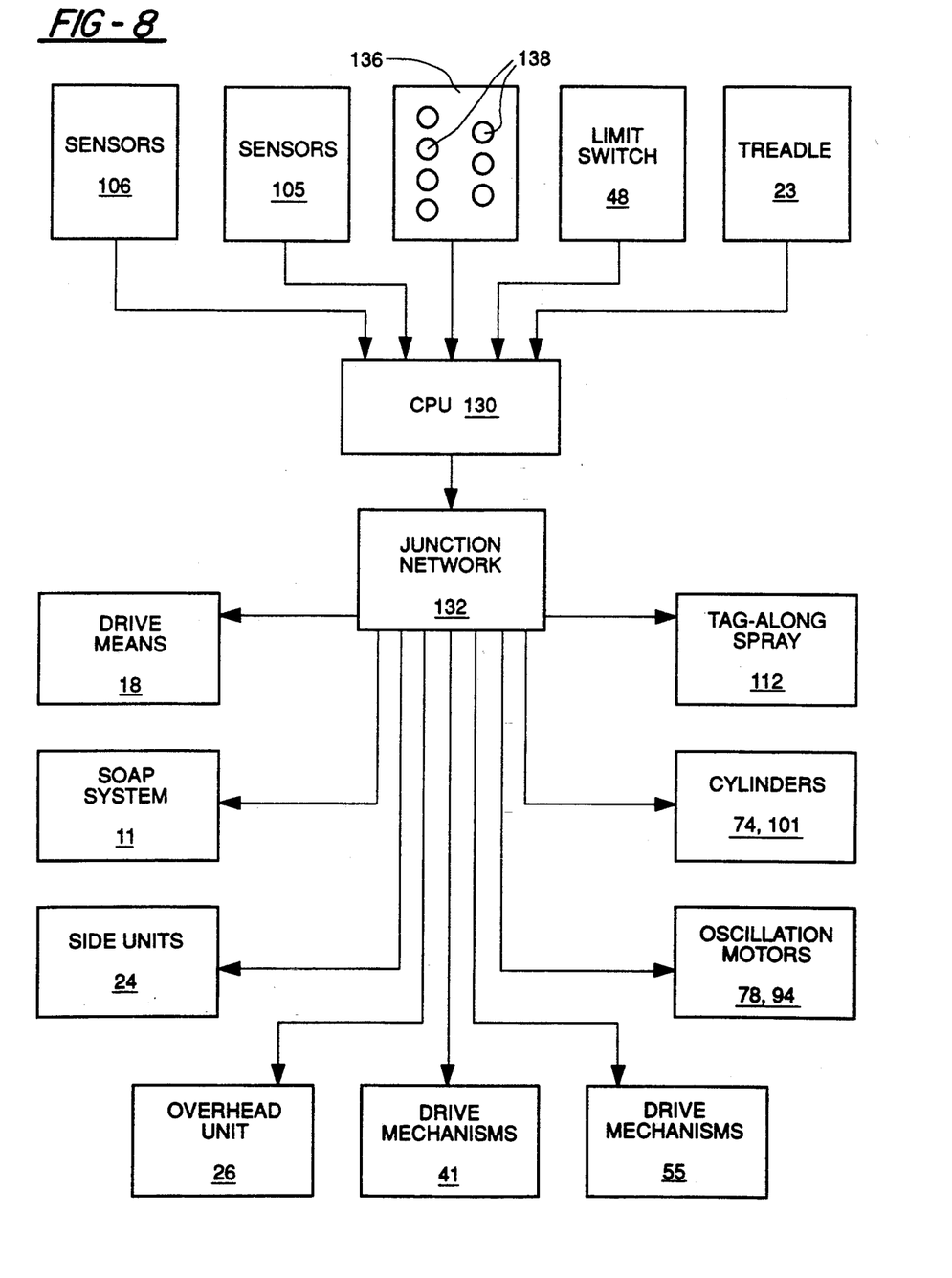
FIG. 8 is a block diagram of a control means for the apparatus of FIG. 1.

With reference to FIG. 8, a typical control system for the rollover apparatus 10 would include a CPU 130 and junction network 132. Each of the previously described wash cycles may be provided using such a control system.

The CPU 130 selectively activates and deactivates portions of the junction network 132 in response to internal programming, operator commands, or other inputs to provide a selected operation of a particular system of the rollover apparatus 10 at a predetermined time. The CPU 130 receives input from sensors 105, sensors 106, keypad 136, limit switch 48, or treadle 23 if these devices are present. The junction network 132 includes valves, relays and related hardware as is known in the industry to control electric motors, spray systems, and the like. The junction network 132 connects to drive means 18, soap system 11, side units 24, overhead unit 26, drive mechanisms 41, drive mechanism 55, oscillation motors 78, 94, pneumatic cylinders 74, 101, and tag along spray bar 112. It should be clear that the CPU 130 may then control any of the devices to perform the previously described methods of adjusting the length of the mitter curtains 28 and other operations of the devices as previously outlined. The keypad 136 provides switches 138 which are adapted to allow an operator to select between alternative wash cycles, vehicle profiles, contact or non contact washes, or the like. Thus, the CPU 130 operates to control each of the devices of the wash apparatus and activate or deactivate the devices at predetermined times during a selected wash cycle.

From the foregoing description of the preferred embodiment it can be seen that various alternative embodiments of the invention can be anticipated without departure from the scope of the invention as defined in the following claims.

I now claim:

1. In a car wash apparatus of the type including at least one mitter curtain adapted to engage a vehicle during relative movement between the apparatus and the vehicle in the wash cycle, the improvement wherein said apparatus includes control means operative during the wash cycle to selectively adjust the length of said mitter curtain between a plurality of operative lengths respectfully engaging a plurality of vehicle portions.

2. An apparatus according to claim 1, wherein said control means is operative to move said mitter curtain between said plurality of operative lengths as a function of the position of said apparatus relative to the vehicle.

3. An apparatus according to claim 2, wherein said control means is operative to move said mitter curtain between said operative lengths as a function of the time required to complete the relative movement between the apparatus and the vehicle.

4. An apparatus according to claim 2, wherein said control means is operative to move said mitter curtain between said operative lengths in response to a selected one of a set of predetermined vehicle profiles.

5. An apparatus according to claim 2, wherein said control means includes means to sense the instantaneous vehicle height and means operative to move said mitter curtain between said plurality of lengths as a function of the sensed vehicle height.

6. An apparatus according to claim 5, wherein said sensing means includes a plurality of sensors operative to detect the instantaneous height of the vehicle.

7. An apparatus according to claim 6, wherein said sensors include opposed pairs of light beam emitters and receivers.

8. A car wash apparatus of the type including a mitter curtain adapted to engage a vehicle during relative movement between the apparatus and the vehicle in the wash cycle, characterized in that said apparatus includes control means operative during the wash cycle to selectively move said mitter curtain between a raised storage position, a lowered operative position, and at least one intermediate operative position.

9. An apparatus according to claim 8, wherein said apparatus includes a roller bar mounted on an overhead support member with the lengthwise axis of said roller bar transverse to the lengthwise axis of the vehicle;

said mitter curtain is attached at one end thereof to said roller bar and has the opposite end thereof hanging freely from said roller bar, at least a portion of the freely hanging end of said mitter curtain being divided into a row of elongated scrubbing strips; and said control means includes drive means for rotating said roller bar about its lengthwise axis to wrap said mitter curtain around said roller bar and vary the length of the portion of said mitter curtain hanging freely therefrom so as to selectively move said mitter curtain between said raised storage position, said lowered operative position, and said at least one intermediate operative position.

10. An apparatus according to claim 9, wherein said apparatus includes means for removing moisture from said mitter curtain, said means being adapted to bear upon said mitter curtain as said mitter curtain is rolled on said roller bar so as to squeeze moisture therefrom.

11. An apparatus according to claim 9, wherein said apparatus includes a plurality of mitter curtains attached to a plurality of respective roller bars disposed substantially parallel to one another.

12. An apparatus according to claim 11, wherein said drive means includes a plurality of wheels respectively secured to said plurality of roller bars with the wheels associated with adjacent roller bars contacting one another so that rotation of one of said roller bars causes rotation of all of said roller bars.

13. An apparatus according to claim 12, wherein said wheels comprise gears.

14. An apparatus according to claim 12, wherein said wheels have an elastomeric material disposed about the circumference thereof.

15. An apparatus according to claim 8, wherein said control means is operative to move said mitter curtain between said lowered operative position and said at least one intermediate operative position as a function of the position of said apparatus relative to the vehicle.

16. An apparatus according to claim 15, wherein said control means is operative to move said mitter curtain between said lowered operative position and said at least one intermediate operative position as a function of the time required to complete the relative movement between the apparatus and the vehicle.

17. An apparatus according to claim 15, wherein said control means is operative to move said mitter curtain between said lowered operative position and said at least one intermediate operative position in response to a selected one of a set of predetermined vehicle profiles.

18. An apparatus according to claim 15, wherein said control means includes means to sense the instantaneous vehicle height and means operative to move said mitter curtain between said lowered operative position and said at least one intermediate operative position as a function of the sensed vehicle height.

19. An apparatus according to claim 18, wherein said sensing means includes a plurality of sensors operative to detect the instantaneous height of the vehicle.

20. An apparatus according to claim 19, wherein said sensors include opposed pairs of light beam emitters and receivers.

21. A roll-over car wash apparatus comprising:
a gantry mounted for movement over the vehicle during the wash cycle;
spray means carried by said gantry;
scrubbing means carried by said gantry;
soaping means carried by said gantry;
control means including selector means operative to select between a plurality of operational modes including a contact mode in which said spray means, said scrubbing means, and said soaping means are operative during said wash cycle and a noncontact mode in which only said spray means and said soaping means are operative during said wash cycle; and
means for removing moisture from said scrubbing means to prevent substantial amounts of moisture from dripping from said scrubbing means when not in use during said wash cycle.

22. An apparatus according to claim 21, wherein said scrubbing means includes a mitter curtain;
said control means includes- drive means for moving said mitter curtain between a relatively raised storage position and a relatively lowered operative position; and
said selector means is operative during said contact mode to selectively move said mitter curtain between its storage and operative positions and is operative during said noncontact mode to maintain said mitter curtain in its storage position.

23. An apparatus according to claim 22, wherein said apparatus includes a roller bar mounted above the vehicle with its lengthwise axis transverse to the lengthwise axis of the vehicle;
said mitter curtain is attached at one end thereof to said roller bar; and
said drive means is adapted for rotating said roller bar about its lengthwise axis to wrap said mitter curtain around said roller bar to vary the length of the portion of said mitter curtain hanging freely therefrom.

24. An apparatus according to claim 23, wherein said drive means is operative to positively rotate said roller bar in a first direction to wrap said mitter curtain therearound, and in a second direction to unwrap said mitter curtain therefrom.

25. An apparatus according to claim 24, wherein said control means includes means to sense the instantaneous vehicle height and means operative to adjust the length of said hanging portions as a function of the sensed vehicle height.

26. An apparatus according to claim 25, wherein said sensing means includes a plurality of sensors operative to detect the instantaneous height of the vehicle.

27. An apparatus according to claim 26, wherein said sensors include opposed pairs of light beam emitters and receivers.

28. An apparatus according to claim 23, wherein said control means further includes means to vary the length of the portion of said mitter curtain hanging freely from said roller bar in said operative position during said contact operative mode as a function of the position of said apparatus relative to the vehicle.

29. An apparatus according to claim 28, wherein said control means adjusts the length of said hanging portions of said mitter curtains in response to a selected one of a set of predetermined vehicle profiles.

30. An apparatus according to claim 22, wherein said means for removing moisture is adapted to bear upon said mitter curtain as said mitter curtain is rolled on said roller bar so as to squeeze moisture therefrom.

31. An apparatus according to claim 21, wherein said wash cycle of said apparatus includes a first forward movement of said gantry over the vehicle followed by a second rearward movement of said gantry over the vehicle;
in said contact mode, said soaping and scrubbing means are operative during said first movement and said spray means is operative during, said second movement; and
in said noncontact mode, said scrubbing means is inoperative during both movements, said soaping is operative during said first movement, and said spray means is operative in said second movement.

32. An apparatus according to claim 31, wherein said spray means includes both a high pressure spray system and a low pressure spray system; and
in said contact and noncontact modes, both said high pressure spray system and said low pressure spray system are operative during said second movements.

33. An apparatus according to claim 21, wherein said wash cycle of said apparatus includes a first forward movement of said gantry over the vehicle followed by a second rearward movement of said gantry over the vehicle followed by a third forward movement of said gantry over the vehicle followed by a fourth rearward movement of said gantry over the vehicle;
in said contact mode, said soaping and scrubbing means are operative during said first movement, said scrubbing means is operative during said second movement, said spray means is operative during said third movement, and said spray means is operative during said fourth movement; and
in said noncontact mode, said scrubbing means is inoperative during all four movements, said soaping is operative during said first movement, and said spray means is operative in said third and fourth movements.

34. An apparatus according to claim 33, wherein said spray means includes both a high pressure spray system and a low pressure spray system; and
in said contact and noncontact modes, both said high pressure spray system and said low pressure spray system are operative during said fourth movements.

35. An apparatus according to claim 21, wherein said wash cycle of said apparatus includes a first forward movement of said gantry over the vehicle followed by a second rearward movement of said gantry over the vehicle followed by a third forward movement of said gantry over the vehicle followed by a fourth rearward movement of said gantry over the vehicle followed by a fifth forward movement of said gantry over the vehicle followed by a sixth rearward movement of said gantry over the vehicle;

in said contact mode, said soaping means is operative during said first movement, said scrubbing means is operative during said second and third movements, and said spray means is operative during said fifth and sixth movements; and in said noncontact mode, said scrubbing means is inoperative during all six movements, said soaping is operative during said first movement, and said spray means is operative in said third fourth fifth and sixth movements.

36. An apparatus according to claim 35, wherein said spray means includes both a high pressure spray system and a low pressure spray system;

in said contact mode, both said high pressure spray system and said low pressure spray system are operative during said sixth movement; and in said noncontact mode, said high pressure spray system is inoperative during said sixth movement, and said low pressure spray system is operative during said sixth movement.

37. A roll-over car wash apparatus of the type including a gantry mounted for movement over the vehicle during the wash cycle, spray means carried by said gantry, scrubbing means carried by said gantry, and soaping means carried by said gantry characterized in that the apparatus includes:

control means including selector means operative to selectively activate or deactive said scrubbing means during a plurality of operational wash cycles; and means for removing moisture from said scrubbing means to prevent substantial amounts of moisture from dripping from said scrubbing means when not in use during said operational wash cycles.

38. An apparatus according to claim 37, wherein said spray means includes an overhead spray unit and a pair of side spray units positioned so as to direct spray on opposite sides of a vehicle; and said selector means is operative to selectively operate said spray units.

39. An apparatus according to claim 38, wherein said selector means is operative to operate said overhead spray unit simultaneously with one of said side spray units.

40. An apparatus according to claim 39, wherein said plurality of operational wash cycles includes a first wash cycle having a first forward movement of said gantry over the vehicle followed by a second rearward movement of said gantry over the vehicle, and a second wash cycle having a first forward movement of said gantry over the vehicle followed by a second rearward movement of said gantry over the vehicle followed by a third forward movement of said gantry over the vehicle followed by a fourth rearward movement of said gantry over the vehicle.

41. An apparatus according to claim 40, wherein said selector means is operative in said first wash cycle to select between a first operational mode in which said spray means, said scrubbing means, and said soaping means are operative during said first wash cycle and a second operational mode in which only said spray means and said soaping means are operative during said first wash cycle.

42. An apparatus according to claim 41, wherein in said first operational mode, said soaping and scrubbing means are operative during said first movement, and said spray means is operative during said second movement; and in said second operational mode, said scrubbing means is inoperative during both movements, said soaping is operative during said first movement, and said spray means is operative in said second movement.

43. An apparatus according to claim 40, wherein said selector means is operative in said second wash cycle to select between a first operational mode in which said spray means, said scrubbing means, and said soaping means are operative during said second wash cycle and a second operational mode in which only said spray means and said soaping means are operative during said second wash cycle.

44. An apparatus according to claim 43, wherein in said first operational mode, said soaping and scrubbing means are operative during said first movement, said scrubbing means is operative during said second movement, said spray means is operative during said third movement, and said spray means is operative during said fourth movement; and in said second operational mode, said scrubbing means is inoperative during all four movements, said soaping is operative during said first movement, and said spray means is operative in said third and fourth movements.

45. An apparatus according to claim 40, wherein said plurality of operative wash cycles further comprises a third wash cycle which includes a first forward movement of said gantry over the vehicle followed by a second rearward movement of said gantry over the vehicle followed by a third forward movement of said gantry over the vehicle followed by a fourth rearward movement of said gantry over the vehicle followed by a fifth forward movement of said gantry over the vehicle followed by a sixth rearward movement of said gantry over the vehicle.

46. An apparatus according to claim 45, wherein said selector means is operative in said third wash cycle to select between a first operational mode in which said spray means, said scrubbing means, and said soaping means are operative during said third wash cycle and a second operational mode in which only said spray means and said soaping means are operative during said third wash cycle.

47. An apparatus according to claim 46, wherein in said first operational mode, said soaping means is operative during said first movement, said scrubbing means is operative during said second and third movements, and said spray means is operative during said fifth and sixth movements; and in said second operational mode, said scrubbing means is inoperative during all six movements, said soaping is operative during said first movement, and said spray means is operative in said third fourth fifth and sixth movements.

48. An apparatus for use in a vehicle wash system providing for relative movement between a vehicle and the apparatus along a path coincident with the normal axis of travel of the vehicle during the wash cycle, comprising:

a frame extending above the path;

at least one overhead support member mounted on said frame in a position above said path;

a plurality of roller bars mounted at spaced intervals on each said overhead support member with their lengthwise axes substantially parallel to one another and transverse to the path;

a plurality of mitter curtains attached to said roller bars, each of said mitter curtains having one end attached to a respective one of said roller bars and having the opposite end thereof hanging freely from the respective roller bar, at least a portion of the freely hanging end of each of said mitter curtains being divided into a row of elongated scrubbing strips;

first drive means operative to rotate said roller bars about their lengthwise axes to wrap said plurality of mitter curtains around their respective roller bars and vary the length of the portion of said mitter curtains hanging freely from said roller bars; and second drive means operative to impart motion to each said overhead support member relative to said frame to thereby impart a scrubbing motion to said hanging portions of said mitter curtains.

49. An apparatus according to claim 48, wherein said apparatus includes means for removing water from at least one said mitter curtain, said means being adapted to bear upon said at least one said mitter curtain as said mitter curtain is rolled on said respective roller bar so as to squeeze moisture therefrom.

50. An apparatus according to claim 49, wherein said means for removing moisture from said mitter curtains includes a bar disposed substantially parallel to the rotational axis of said respective roller bar and adapted to bear upon said at least one mitter curtain.

51. An apparatus according to claim 50, wherein said bar is adapted to bear upon a plurality of mitter curtains on respective roller bars as said plurality of mitter curtains are rolled thereon so as to squeeze moisture from said plurality of mitter curtains.

52. An apparatus according to claim 48, wherein said first drive means includes a plurality of wheels respectively secured to said roller bars with the wheels associated with adjacent roller bars contacting one another so that rotation of one of said roller bars causes rotation of all of said roller bars.

53. An apparatus according to claim 52, wherein said wheels comprise gears.

54. An apparatus according to claim 52, wherein said wheels have an elastomeric material disposed about the circumference thereof.

55. An apparatus according to claim 48, wherein said apparatus includes means to operatively control said first drive means to adjust the length of said hanging portions of said mitter curtains during the wash cycle as a function of the position of said apparatus relative to the vehicle.

56. An apparatus according to claim 55, wherein said means to operatively control said first drive means adjusts the length of said hanging portions as a function of the time required to complete the relative movement between the vehicle and the apparatus.

57. An apparatus according to claim 55, wherein said means to operatively control said first drive means adjusts the length of said hanging portions in response to a selected one of a set of predetermined vehicle profiles.

58. An apparatus according to claim 55, wherein said means to operatively control said first drive means includes means to adjust the length of said hanging portions of said mitter curtains between a minimum length storage position and a maximum length operative position.

59. An apparatus according to claim 48, wherein said apparatus includes control means operative to sense the instantaneous vehicle height and means operative to adjust the length of said hanging portions as a function of the sensed vehicle height.

60. An apparatus according to claim 59, wherein said sensing means includes a plurality of sensors operative to detect the height of the vehicle.

61. An apparatus according to claim 60, wherein said sensors include opposed pairs of light beam emitters and receivers.

62. An apparatus according to claim 48, wherein said at least one overhead support member comprises a plurality of overhead support members.

63. An apparatus according to claim 62, wherein said means adapted to impart motion to each of said overhead support members comprises means adapted to move each of said plurality of overhead support members out of phase with at least one other support member in a direction along the path.

64. An apparatus according to claim 63, wherein each of said plurality of overhead support members move 180 degrees out of phase with at least one other support member in a direction along the path.

65. An apparatus according to claim 62, wherein wherein each said overhead support member pivotably attaches to said frame at a point above said roller bars.

66. An apparatus according to claim 48, wherein said apparatus further includes a spray system attached to said frame, comprising soaping means adapted to spray a vehicle in the path with a low pressure soap solution, overhead spray means adapted to direct high pressure rinse spray on the top surfaces of a vehicle in the path, and side spray means adapted to direct high pressure rinse spray on the side surfaces of a vehicle in the path.

67. An apparatus according to claim 66, wherein said overhead spray system is attached to an elongated rack pivotably mounted on said frame above said path having a pivot axis disposed transverse to said path; and said apparatus further includes means for pivoting said rack in a direction along the path to direct spray forward with respect to said relative motion.

68. An apparatus according to claim 67, wherein said overhead spray system further includes a plurality of spray bars, each of said spray bars having a plurality of nozzles adapted to direct said spray onto the upper surface of the vehicle, and each having an oscillatory axis transverse to the pivot axis of said rack; and said apparatus further includes means for oscillating said spray bars about said oscillatory axes to produce a sweeping action of said spray widthwise across a portion of the upper surface of the vehicle.

69. An apparatus according to claim 66, wherein said side spray means is attached to at least one rack pivotably mounted on said frame alongside said path having a pivot axis disposed substantially vertically and to one side of said path; and said apparatus further includes means for pivoting said rack in a direction along the path to direct spray forward with respect to said relative motion.

70. An apparatus according to claim 69, wherein said side spray means further includes at least one spray bar having a plurality of nozzles adapted to direct spray onto a side surface of the vehicle, and having an oscillatory axis disposed substantially transverse to the pivot axis of said rack; and means for oscillating said at least one spray bar to produce a sweeping action of said spray heightwise across a side surface of the vehicle.

71. A roll-over car wash apparatus operative to wash a vehicle while moving relative to the vehicle along a path coincident with the normal axis of travel of the vehicle, comprising:

a frame extending above the path;

a pair of overhead support members mounted side-by-side on said frame above said path;

a plurality of roller bars mounted at spaced intervals on each said overhead support member with their lengthwise axes substantially parallel to one another and transverse to the path;

a plurality of mitter curtains respectively attached to said roller bars, each of said mitter curtains having one end attached to a respective one of said roller bars and having the opposite end thereof hanging freely from the respective roller bar, at least a portion of the freely hanging end of each of said mitter curtains being divided into a row of elongated scrubbing strips;

first drive means operative to rotate said roller bars about their lengthwise axes to wrap said plurality of mitter curtains around their respective roller bars and vary the length of the portion of said mitter curtains hanging freely from said roller bars; and second drive means operative to impart motion to each overhead support member relative to said frame out of phase with the other overhead support member to thereby impart a scrubbing motion to said hanging portions of said mitter curtains.

72. A roll-over car wash apparatus operative to wash a vehicle while moving relative to the vehicle along a path coincident with the normal axis of travel of the vehicle, comprising:

a frame extending above the path;

a soap system attached to said frame operative to spray the vehicle with a low pressure soap solution;

a pair of overhead support members mounted side-by-side on said frame above said path;

a plurality of roller bars mounted at spaced intervals on each said overhead support member with their lengthwise axes substantially parallel to one another and transverse to the path;

a plurality of mitter curtains respectively attached to said roller bars, each of said mitter curtains having one end attached to a respective one of said roller bars and having the opposite end thereof hanging freely from the respective roller bar, at least a portion of the freely hanging end of each of said mitter curtains being divided into a row of elongated scrubbing strips;

first drive means operative to rotate said roller bars about their lengthwise axes to wrap said plurality of mitter curtains around their respective roller bars and vary the length of the portion of said mitter curtains hanging freely from said roller bars;

second drive means operative to impart motion to each overhead support member relative to said frame out of phase with the other overhead support member to thereby impart a scrubbing motion to said hanging portions of said mitter curtains; and a spray system attached to said frame comprising overhead spray and side spray systems, said overhead spray system adapted to direct high pressure spray on the top surfaces of the vehicle, and said side spray system adapted to direct high pressure spray on the side surfaces of the vehicle.

* * * * *